April 28, 1942.　　A. B. NESBITT ET AL　　2,281,374
THREADING MACHINE
Filed May 31, 1939　　2 Sheets-Sheet 1
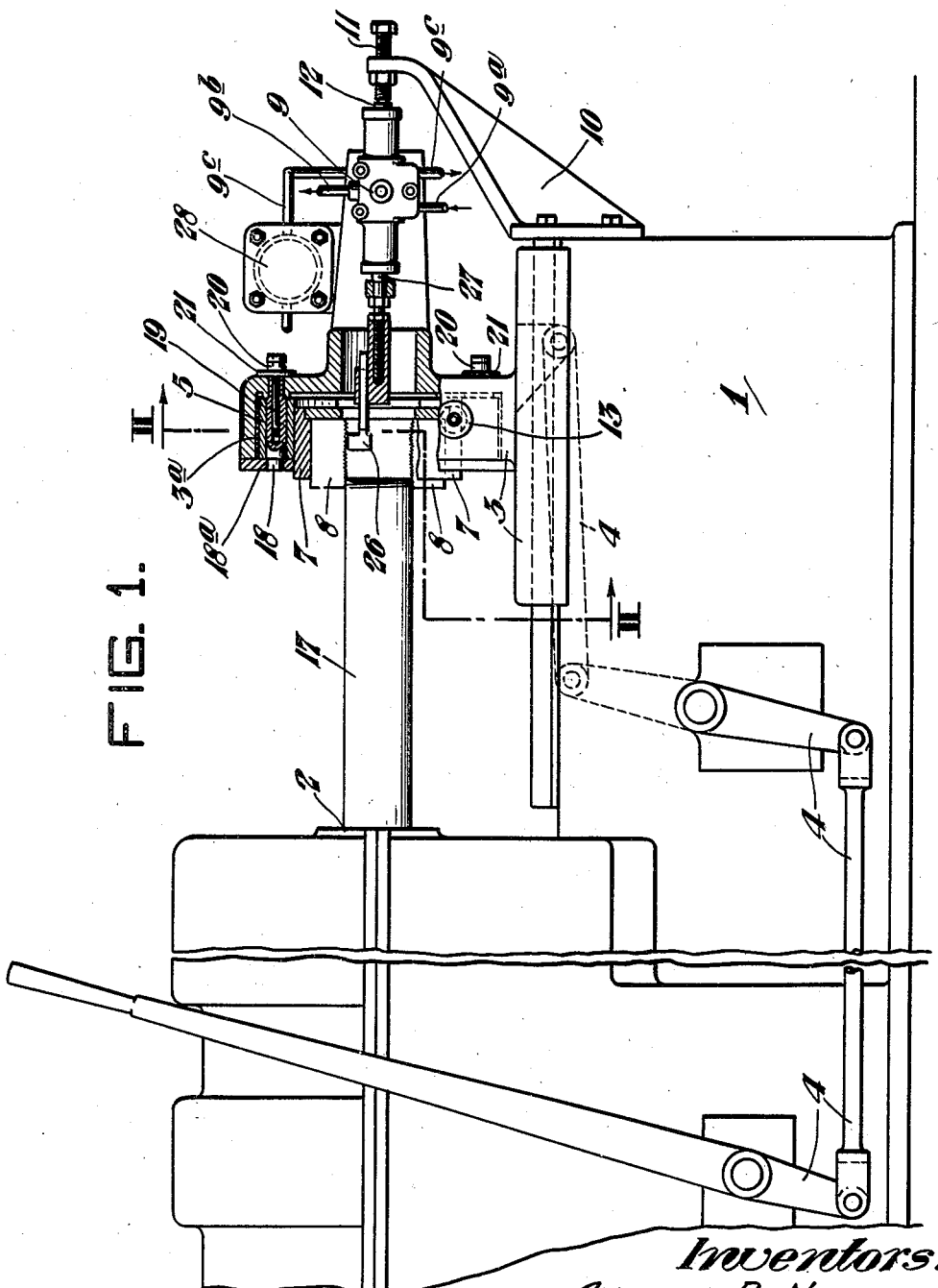
Inventors:
ANDREW B. NESBITT
and SAMUEL WEBB.
by John E. Jackson
their Attorney.

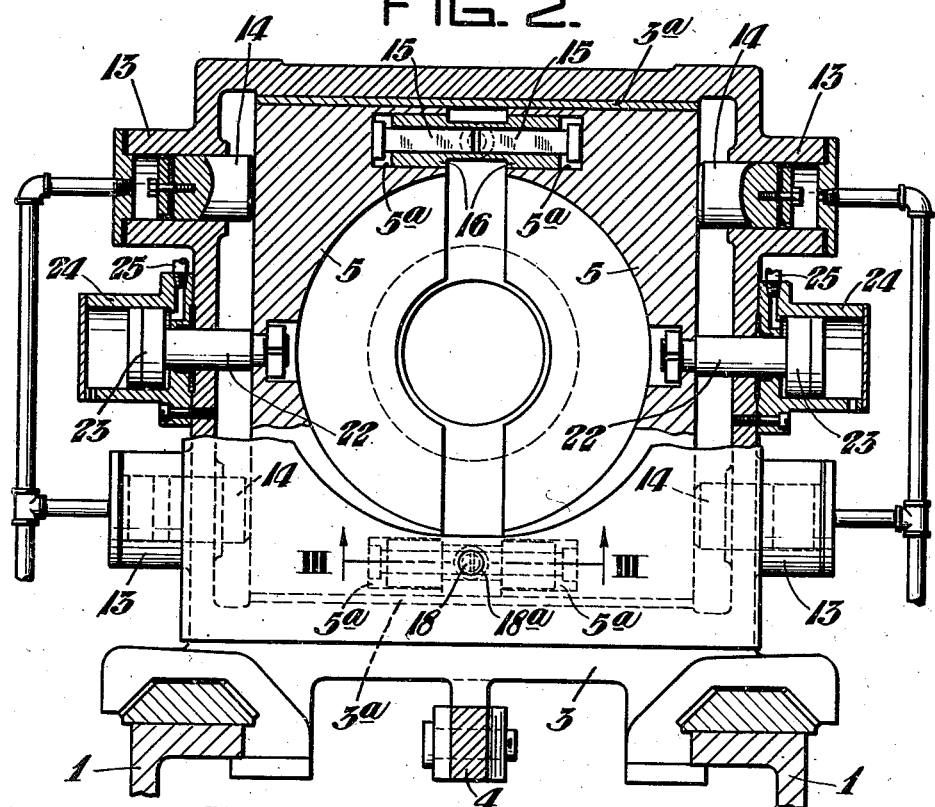
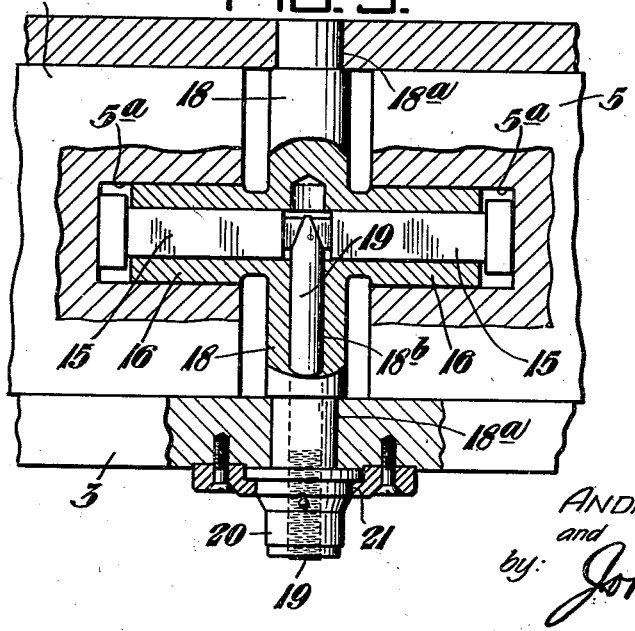
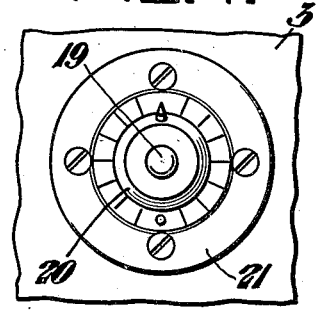

Patented Apr. 28, 1942

2,281,374

UNITED STATES PATENT OFFICE 2,281,374

THREADING MACHINE

Andrew B. Nesbitt and Samuel Webb, Pittsburgh, Pa., assignors to National Tube Company, a corporation of New Jersey Application May 31, 1939, Serial No. 276,750

5 Claims. (Cl. 10—89)

This invention relates to screw threading machines, but it is particularly concerned with the apparatus used to open and close separable threading dies. Such dies are made to separate so that they can be released from the article threaded upon completion of the threading operation, whereby they may be removed more quickly than if it were necessary to unscrew them.

A specific example of the invention is illustrated by the accompanying drawings, in which:

Figure 1 is an elevation partly in section;

Figure 2 is a section on the line II—II in Figure 1;

Figure 3 is a section on the line III—III in Figure 2; and,

Figure 4 is a detail.

More specifically, these drawings illustrate a screw threading machine having a bed 1 provided with a rotating chuck pipe gripper 2 and a die carriage 3, the latter being arranged for reciprocation on the ways of the threading machine, by means of a lever system 4.

Reciprocative die heads 5 are carried in the carriage 3, these heads housing the half dies in the form of die holders 7 having chasers 8. The heads 5 are mounted in the carriage 3 for opposite linear reciprocation by guides 3ª on which the heads slide.

A latch control valve 9 is carried by the carriage 3 and is in communication with a supply of fluid under pressure by way of a flexible connection 9ª. A bracket 10 fixed to the bed 1 of the threading machine supports an adjustable screw 11 for contact by a valve plunger 12 just before the carriage 3 reaches its extreme retracted position, this valve plunger serving to operate the valve 9 so that it supplies fluid under pressure through a pipe 9ᵇ to cylinders 13 formed in the carriage 3 and having pistons 14 which bear against the die heads 5. These cylinders and pistons provide fluid-operated motors, and there are two of these for each of the die heads 5, the motors working against the die heads.

Forward motion of the half die heads 5 is stopped when they contact pins 15, the heads being stopped so that the separable die parts are properly positioned for threading operations.

To start threading operations, the work 17 which is to be threaded, is held in the rotating chuck 2 and the die carriage 3 is moved to engage the work 17, the valve 9 being open at this time so as to admit fluid to the cylinders 13, the pistons 14 then holding the die heads 5 against separation. Reciprocation of the carriage 3 is effected by the lever system 4, the carriage 3 feeding automatically after threading has once started.

Bottom bores 5ª are oppositely formed in alignment in oppositely facing parts of the die heads 5, a sleeve 16 having trunnions 18 journaled at 18ª, riding in these bores 5ª, and the pins 15 being inside these sleeves and bearing against the bottoms of the bores 5ª. The trunnions 18 are journaled transverse the reciprocating paths of the die head whereby the sleeves hold the die heads aligned against transverse shifting.

In each instance one of the trunnions 18 has a bore 18ᵇ in which a reciprocative wedge 19 works, the tapered part of this wedge working against the adjacent ends of the pins 15 and the wedge being reciprocated by an end that is in screw threaded engagement with a nut 20 journaled by a bearing 21. This nut may be provided with a suitable indicator for indicating the position of the wedge 19 and, therefore, the setting of the separable die.

Each of the die heads 5 is connected by tension rods 22 to pistons 23 working in cylinders 24, fluid under pressure constantly being introduced to the bottoms of these cylinders 24 by way of inlets 25. In each instance there is only one of the cylinders 24, with its associated parts, for the two cylinders 13 with their associated parts, the cross-sectional area of the cylinder 24 being in each instance much less than the combined cross-sectional areas of the cylinders 13.

Threading operations continue until the work 17 contacts a stop 26 which, through interconnecting elements, operates a valve plunger 27 which works the valve 9 so as to close the communication between the pipes 9ª and 9ᵇ and so as to connect the pipe 9ᵇ with an exhaust pipe 9ᶜ, this relieving the pressure in the cylinders 13, whereupon the pistons 23 function to pull the die heads 5 apart, thus stopping the threading action by separating the separable die.

The fluid conducting system of the various pipes mentioned includes a conventional device 28 through which the pipe 9ᶜ works and which prevents rapid exhausting of the fluid pressure in the cylinders 13, thus causing gradual separation of the die heads, which is desirable. Operation of the lever system 4 again retracts the carriage 3 for another operating cycle.

We claim:

1. Screw threading apparatus including die heads for mounting the parts of a separable threading die, means oppositely mounting said die heads for opposite linear reciprocation, means for oppositely reciprocating said die heads, and means for limiting the approach of said die heads respecting one another, the last named means comprising a sleeve riding in opposite bottomed bores formed in alignment in oppositely facing parts of said die heads, pins inside said sleeve and respectively bearing on the opposite bottoms of said bores and a wedge working against the adjacent ends of said pins.

2. Screw threading apparatus including die heads for mounting the parts of a separable threading die, means oppositely mounting said die heads for opposite linear reciprocation, means for oppositely reciprocating said die heads, and means for limiting the approach of said die heads respecting one another, the last named means comprising a sleeve riding in opposite bottomed bores formed in alignment in oppositely facing parts of said die heads, pins inside said sleeve and respectively bearing on the opposite bottoms of said bores and a wedge working against the adjacent ends of said pins, said sleeve centrally having trunnions with fixed bearings mounting said trunnions transverse the reciprocating paths of said die head.

3. Screw threading apparatus including die heads for mounting the parts of a separable threading die, means oppositely mounting said die heads for opposite linear reciprocation, means for oppositely reciprocating said die heads, and means for limiting the approach of said die heads respecting one another, the last named means comprising a sleeve riding in opposite bottomed bores formed in alignment in oppositely facing parts of said die heads, pins inside said sleeve and respectively bearing on the opposite bottoms of said bores and a wedge working against the adjacent ends of said pins, said sleeve centrally having trunnions with fixed bearings mounting said trunnions transverse the reciprocating paths of said die head, one of said trunnions having a bore and said wedge passing therethrough with an end accessible for manipulation.

4. Screw threading apparatus including die heads for mounting the parts of a separable threading die, means oppositely mounting said die heads for opposite linear reciprocation and means for oppositely reciprocating said die heads, said reciprocating means being fluid operated and provided with a valved fluid conducting system for the control thereof to effect opposite reciprocation of said die head, said system having means rendering the same automatically responsive upon completion of the screw threading action of the die held by said die heads so as to effect separating movement of said die heads, the latter being mounted for reciprocation longitudinally of the work being threaded and said system having means rendering it automatically responsive upon movement of said die heads longitudinally away from said work to a predetermined, retracted position, for causing said fluid operated means to effect approaching movement of said die heads.

5. Screw threading apparatus including die heads for mounting the parts of a separable threading die, means oppositely mounting said die heads for opposite linear reciprocation and means for oppositely reciprocating said die heads, said reciprocating means being fluid operated and provided with a valved fluid conducting system for the control thereof to effect opposite reciprocation of said die head, said system having means for retarding to a predetermined factor the velocity of fluid conducted thereby, whereby said fluid operated means works at a predetermined speed.

ANDREW B. NESBITT.
SAMUEL WEBB.